United States Patent [19]
Mikkelsen et al.

[11] Patent Number: 5,995,724
[45] Date of Patent: Nov. 30, 1999

[54] IMAGE PROCESS SYSTEM AND PROCESS USING PERSONALIZATION TECHNIQUES

[76] Inventors: Carl Mikkelsen, 11 Old Garrison Rd., Sudbury, Mass. 01776; Michael Speciner, 10 Huckleberry Ln., Acton, Mass. 01720; Edward S. Gavrin, 7 Spruce Hill Rd., Weston, Mass. 02193

[21] Appl. No.: 08/741,786

[22] Filed: Nov. 1, 1996

[51] Int. Cl.⁶ .................................................. B41B 15/00
[52] U.S. Cl. .......................... 395/115; 395/115; 395/116; 395/114; 395/113; 345/435; 707/531; 707/517
[58] Field of Search ..................... 395/115, 116, 395/114, 113; 345/435; 707/517, 531; 364/419.1

[56] References Cited

U.S. PATENT DOCUMENTS

| | | | |
|---|---|---|---|
| 3,921,135 | 11/1975 | Komaru et al. | 340/146.3 |
| 4,028,731 | 6/1977 | Arps et al. | 358/260 |
| 4,409,621 | 10/1983 | Richards et al. | 358/260 |
| 4,467,363 | 8/1984 | Tench, Jr. | 358/261 |
| 4,580,162 | 4/1986 | Mori | 358/135 |
| 4,649,513 | 3/1987 | Martin et al. | 345/115 |
| 4,725,815 | 2/1988 | Mitchell et al. | 340/347 |
| 4,791,680 | 12/1988 | Yokoe et al. | 382/56 |
| 4,868,653 | 9/1989 | Golin et al. | 358/133 |
| 4,875,174 | 10/1989 | Olodort et al. | 364/519 |
| 4,949,188 | 8/1990 | Sato | 358/448 |
| 4,965,751 | 10/1990 | Thaver et al. | 364/521 |
| 5,034,804 | 7/1991 | Sasaki et al. | 358/41 |
| 5,050,100 | 9/1991 | Damon et al. | 364/514 |
| 5,056,044 | 10/1991 | Frederickson et al. | 364/521 |
| 5,068,805 | 11/1991 | Tsuzuki | 395/164 |
| 5,079,630 | 1/1992 | Golin et al. | 358/133 |
| 5,087,979 | 2/1992 | Schaertel | 358/296 |
| 5,095,520 | 3/1992 | Kim | 395/101 |
| 5,122,873 | 6/1992 | Golin | 358/133 |
| 5,129,049 | 7/1992 | Cuzzo et al. | 395/113 |
| 5,146,544 | 9/1992 | Altham et al. | 395/115 |
| 5,146,548 | 9/1992 | Bijnagte | 395/117 |
| 5,150,454 | 9/1992 | Wood et al. | 395/114 |
| 5,151,949 | 9/1992 | Mivata | 382/9 |
| 5,185,599 | 2/1993 | Doornink et al. | 347/747 |
| 5,199,803 | 4/1993 | Shimizu et al. | 400/121 |
| 5,204,738 | 4/1993 | Arasaki | 358/75 |
| 5,206,735 | 4/1993 | Gauronski et al. | 358/296 |

(List continued on next page.)

FOREIGN PATENT DOCUMENTS

| | | | |
|---|---|---|---|
| 0 119 720 A2 | 9/1984 | European Pat. Off. | 15/20 |
| 0 146 714 A2 | 7/1985 | European Pat. Off. | 15/20 |
| 0 235 456 A2 | 9/1987 | European Pat. Off. | . |
| 0 320 014 A2 | 6/1989 | European Pat. Off. | 15/72 |
| 0 378 316 A1 | 7/1990 | European Pat. Off. | 1/41 |

(List continued on next page.)

OTHER PUBLICATIONS

PCT, "International Search Report" for International Application No. PCT/.US 97/16733; filed on 19/09/1997.

Arlene Karsh, "Variable data on digital Presses: Making Progress," Sevbold Report on Publishing Systems, vol. 25, No. 22, pp. 3–14.

*Primary Examiner*—Edward L. Coles
*Assistant Examiner*—Twyleie Lamb
*Attorney, Agent, or Firm*—Wolf, Greenfield & Sacks, P.C.

[57] ABSTRACT

Fixed and variable content is merged to produce personalized documents using a raster image processor that, for each page to be printed, initializes a frame buffer according to fixed content specified for the page. The fixed content may be specified in initialization information that is placed at the beginning of the stream of variable content to be processed or could be specified in some other manner. Such information may be specified through user input to a printer driver that processes documents to be printed from arbitrary applications into page descriptions used by the raster image processor. The specified fixed content may be preprocessed and stored in memory accessible to the raster image processor. The variable content then may be added to the frame buffer without the need to specify a region in which it should be placed.

28 Claims, 4 Drawing Sheets

U.S. PATENT DOCUMENTS

| | | | |
|---|---|---|---|
| 5,207,517 | 5/1993 | Ito | 400/121 |
| 5,208,676 | 5/1993 | Inui | 358/296 |
| 5,210,623 | 5/1993 | Weldy | 358/458 |
| 5,231,695 | 7/1993 | Harrington | 395/134 |
| 5,241,397 | 8/1993 | Yamada | 358/296 |
| 5,263,136 | 11/1993 | DeAquair et al. | 395/164 |
| 5,270,728 | 12/1993 | Lund et al. | 346/1.1 |
| 5,272,768 | 12/1993 | Bauman et al. | 395/110 |
| 5,276,780 | 1/1994 | Sugiura | 395/116 |
| 5,295,233 | 3/1994 | Ota | 395/115 |
| 5,297,217 | 2/1994 | Hamilton, Jr. et al. | 382/41 |
| 5,299,292 | 3/1994 | Kadowaki et al. | 395/108 |
| 5,299,310 | 3/1994 | Motoyama | 395/165 |
| 5,303,334 | 4/1994 | Snyder et al. | 395/109 |
| 5,315,693 | 5/1994 | Hirosawa | 395/128 |
| 5,315,696 | 5/1994 | Case et al. | 395/133 |
| 5,315,698 | 5/1994 | Case et al. | 395/162 |
| 5,321,810 | 6/1994 | Case et al. | 395/166 |
| 5,337,258 | 8/1994 | Dennis | 364/551.01 |
| 5,341,472 | 8/1994 | Leak | 395/166 |
| 5,347,368 | 9/1994 | Mochizuki | 358/296 |
| 5,349,647 | 9/1994 | Freiburg et al. | 395/115 |
| 5,354,135 | 10/1994 | Sakagami et al. | 400/124 |
| 5,355,441 | 10/1994 | Kawai et al. | 395/115 |
| 5,363,107 | 11/1994 | Gertz et al. | 342/26 |
| 5,369,533 | 11/1994 | Ottesen et al. | 360/51 |
| 5,374,657 | 12/1994 | Sharma | 348/391 |
| 5,374,943 | 12/1994 | Lehmann et al. | 347/9 |
| 5,377,312 | 12/1994 | Kobauasio | 395/116 |
| 5,384,912 | 1/1995 | Ogrinc et al. | 395/164 |
| 5,387,783 | 2/1995 | Mihm et al. | 235/375 |
| 5,413,321 | 5/1995 | Banks et al. | 270/58 |
| 5,428,423 | 6/1995 | Clark | 355/77 |
| 5,438,653 | 8/1995 | Boenke et al. | 395/131 |
| 5,445,367 | 8/1995 | Long | 270/1.1 |
| 5,457,549 | 10/1995 | Kimada et al. | 358/530 |
| 5,459,818 | 10/1995 | Grant et al. | 395/114 |
| 5,465,304 | 11/1995 | Cullen et al. | 382/176 |
| 5,471,563 | 11/1995 | Dennis et al. | 395/114 |
| 5,479,587 | 12/1995 | Campbell et al. | 395/116 |
| 5,483,622 | 1/1996 | Zimmerman et al. | 395/114 |
| 5,493,105 | 2/1996 | Desai | 235/375 |
| 5,497,498 | 3/1996 | Taylor | 395/800 |
| 5,500,924 | 3/1996 | deSilva et al. | 395/129 |
| 5,500,928 | 3/1996 | Cook et al. | 395/133 |
| 5,502,636 | 3/1996 | Clarke | 364/401 |
| 5,504,842 | 4/1996 | Gentile | 395/114 |
| 5,504,843 | 4/1996 | Catapano et al. | 395/115 |
| 5,506,944 | 4/1996 | Gentile | 395/114 |
| 5,506,985 | 4/1996 | Motoyama et al. | 395/600 |
| 5,509,115 | 4/1996 | Butterfield et al. | 395/147 |
| 5,511,156 | 4/1996 | Nagasaka | 395/133 |
| 5,532,838 | 7/1996 | Barbari | 358/400 |
| 5,539,865 | 7/1996 | Gentile | 395/115 |
| 5,544,290 | 8/1996 | Gentile | 395/115 |
| 5,552,898 | 9/1996 | Deschuvtere | 358/426 |
| 5,552,982 | 2/1994 | Jackson et al. | 395/145 |
| 5,594,860 | 1/1997 | Gauthier | 395/501 |
| 5,600,768 | 2/1997 | Andressen | 345/435 |
| 5,602,976 | 2/1997 | Cooper et al. | 395/116 |
| 5,615,314 | 3/1997 | Schoenzeit et al. | 395/114 |
| 5,625,712 | 4/1997 | Schoenzeit et al. | 382/245 |
| 5,638,498 | 6/1997 | Tyler et al. | 395/117 |
| 5,845,302 | 12/1995 | Cyman, Jr. et al. | 707/517 |
| 5,890,742 | 4/1999 | Waller | 283/67 |

FOREIGN PATENT DOCUMENTS

| | | | |
|---|---|---|---|
| 0 402 016 A2 | 12/1990 | European Pat. Off. | |
| 0 411 232 A2 | 2/1991 | European Pat. Off. | 1/411 |
| 0 475 601 A3 | 3/1992 | European Pat. Off. | 15/72 |
| 0 512 174 A1 | 11/1992 | European Pat. Off. | |
| 0 583 107 A | 2/1994 | European Pat. Off. | |
| 0 585 074 A2 | 3/1994 | European Pat. Off. | 15/72 |
| 0 586 074 A2 | 3/1994 | European Pat. Off. | |
| 0 598 571 A2 | 5/1994 | European Pat. Off. | 15/72 |
| 0 609 985 A2 | 8/1994 | European Pat. Off. | |
| 0 613 102 A1 | 8/1994 | European Pat. Off. | |
| 0 764 918 A2 | 3/1997 | European Pat. Off. | |
| 2 702 580 A1 | 9/1994 | France | |
| 38 16627 A1 | 11/1989 | Germany | 1/21 |
| WO 96/39681 | 12/1996 | WIPO | |

IMAGE PROCESS SYSTEM AND PROCESS USING PERSONALIZATION TECHNIQUES

FIELD OF THE INVENTION

The present invention is related generally to image processing. In particular, the present invention is related to raster image processors using personalization techniques.

BACKGROUND OF THE INVENTION

A common use of computers is preparation of personalized documents. Personalized documents are, generally, a set of documents, such as form letters, which include information which is shared by all of the documents, such as the body of a form letter, and information which is unique to each document, such as a name and address for a recipient of a form letter. The shared data generally is called "fixed" data or information, whereas the unique data generally is called "variable" data or information. Personalized documents may be simple, such as form letters, or complex, such as a catalog with item descriptions or prices individually targeted to each customer.

The general problem addressed in any computer system which generates personalized documents is how to merge variable information with fixed information while printing in volume at a reasonable speed.

In some systems, variable information is merged with fixed information prior to formatting of the merged data for printing. For example, a word processing program may have a feature which creates multiple documents, such as form letters, by filling in a template (fixed information) with variable information, e.g., addresses, taken from another data file to create a set of personalized documents. Such a feature often is called a "mail merge" operation. Using such a feature, however, results in duplicative processing of the fixed information when each personalized document is actually printed.

Many other commercially available computer systems which control electronic printing systems to prepare personalized documents are designed based on analogies to mechanical printing systems. In mechanical printing systems, fixed information generally is printed first, and variable information is then printed in specified regions within the fixed information. In electronic printing systems, fixed content is processed as a raster image in a frame buffer used by a printing engine. Variable data for each personalized document is placed in the raster image by specifying a region of the frame buffer to be modified, and modifying the contents of the frame buffer with the variable data for the specified region for the currently processed document. As a result, a raster image processor or other application providing the variable data must be specialized so that it may specify particular regions of the frame buffer which will be modified. As a result, such systems tend to be cumbersome, expensive and require content to be generated by only specialized applications which are capable of specifying regions of a frame buffer. Because of such limitations, these systems often require special operator training.

SUMMARY OF THE INVENTION

The present invention solves the problem of merging fixed and variable content by using a raster image processor that, for each page to be printed, initializes a frame buffer according to fixed content specified for the page. The fixed content may be specified in initialization information that is placed at the beginning of the stream of variable content to be processed, or could be specified in some other manner. This fixed content may be preprocessed and stored in memory accessible to the raster image processor. The variable content then may be added to the frame buffer without the need to specify a region in which it should be placed.

In one embodiment of a computer system in accordance with the invention, both fixed content and variable content can be defined by any application that can issue a command to print data. A printer driver receives the data from the application and converts it into a series of commands in a page description language defining the document to be printed. The printer driver is programmable so that a user may specify that data being printed should be applied to fixed content, i.e., it is variable content, or may be used as fixed content, or both. Such a specification may be inserted at the beginning of the series of commands defining the document to be printed along with other initialization information provided by the printer driver. This series of commands is processed by the raster image processor to generate, in the frame buffer, a raster image of each page of the personalized document. In particular, for each page, the raster image processor initializes a frame buffer according to whether the data being printed should be applied to any specified fixed content. The appropriate content, or no content, is read from memory into the frame buffer. The data being printed, when defined using commands in a page description language, is automatically converted into image data and locations in the frame buffer without specifying regions. When the page is completely processed, the raster image processor may store the contents of the frame buffer according to whether the data may be used as fixed content.

Accordingly, one aspect of the invention is a computer system or a computer-implemented process for generating personalized documents. A frame buffer is used by a raster image processor to generate each frame of a document to be printed. A first input to the raster image processor is fixed content, while a second input is variable content. The variable content has variable content information which follows initialization information which includes an indication of a source of the fixed content. The initialization information in the variable content is processed to identify the indication of the source of the fixed content. The indicated source of the fixed content is accessed to retrieve the fixed content. The frame buffer is initialized according to the received fixed content. The variable content information is then processed so as to modify the contents of the frame buffer according to the processed variable content information. In one embodiment, fixed content is preprocessed and is stored in data files on a computer readable medium accessible by the raster image processor. In this embodiment, the indication of the source of the fixed content includes an indication of one of the data files on the computer readable medium. The frame buffer is initialized by reading the fixed content into the frame buffer.

In one embodiment of the invention, the frame buffer is a virtual frame buffer which is divided logically into several regions. Each frame of preprocessed fixed content is stored using a representation including an indication of the plurality of regions into which the frame is divided, compressed image data for each region and an index indicating a storage location of the compressed image data for each region. The preprocessed fixed content is read into the virtual frame buffer by initializing a representation of the virtual frame buffer using the indication of the plurality of regions and the index. Variable content information is added by identifying each pixel of the frame buffer affected by the variable content information, and changing the pixel value to contain the variable information. Modifying the pixel value may require compressing, decompressing or otherwise processing the previous contents of the pixel.

BRIEF DESCRIPTION OF THE DRAWING

For a better understanding of the present invention, reference is made to the accompanying drawings, where are incorporated herein by reference and in which.

DETAILED DESCRIPTION

The present invention will be more completely understood through the following detailed description which should be read in conjunction with the attached drawing in which similar reference numbers indicate similar structures.

Figure 1:
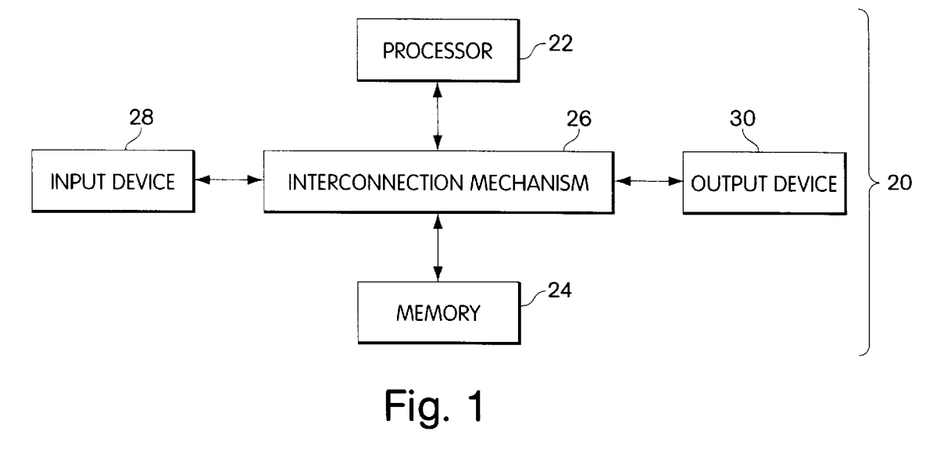
FIG. 1 is a block diagram of an example computer system which may be used for implementing the present invention.

The present invention may be implemented using a digital computer. A typical computer system 20 is shown in FIG. 1, and includes a processor 22 connected to a memory system 24 via an interconnection mechanism 26. The interconnection mechanism is typically a combination of one or more buses and one or more switches. An input device 28 is also connected to the processor and memory system via the interconnection mechanism, as is an output device 30, such as a printer.

It should be understood that one or more output devices may be connected to the computer system. Example output devices include a cathode ray tube (CRT) display, liquid crystal display (LCD), printers including color laser copiers, communication devices, such as a modem, and audio output. It should also be understood that one or more input devices 28 may be connected to the computer system. Example input devices include a keyboard, keypad, trackball, mouse, pen and tablet, communication device, audio input and image scanner. It should be understood that the invention is not limited to the particular input or output devices used in combination with the computer system or to those described herein. The input and output devices may be included within or external to a main unit which typically houses the processor 22, memory system 24 and interconnection mechanism 26.

The computer system 20 may be a general purpose computer system, which is programmable using a high level computer programming language, such as "C++." The computer system may also be implemented using specially programmed, special purpose hardware. In a general purpose computer system, the processor is typically a commercially available processor, such as the Pentium microprocessor from Intel Corporation, PowerPC microprocessor or 68000 series microprocessor. Many other processors are also available. Such a processor executes a program called an operating system, such as the various versions of the Windows and DOS operating systems from Microsoft Corporation or the System 7 operating system from Apple Computer, which controls the execution of other computer programs and provides scheduling, debugging, input-output control, accounting compilation, storage assignment, data management, memory management, and communication control and related services. The processor and operating system define a computer platform for which application programs in high level programming languages are written. It should be understood that the invention is not limited to a particular computer platform, particular operating system, particular processor, or particular high level programming language. Additionally, the computer system 20 may be a multi-processor computer system or may include multiple computers connected over a computer network.

Figure 2:
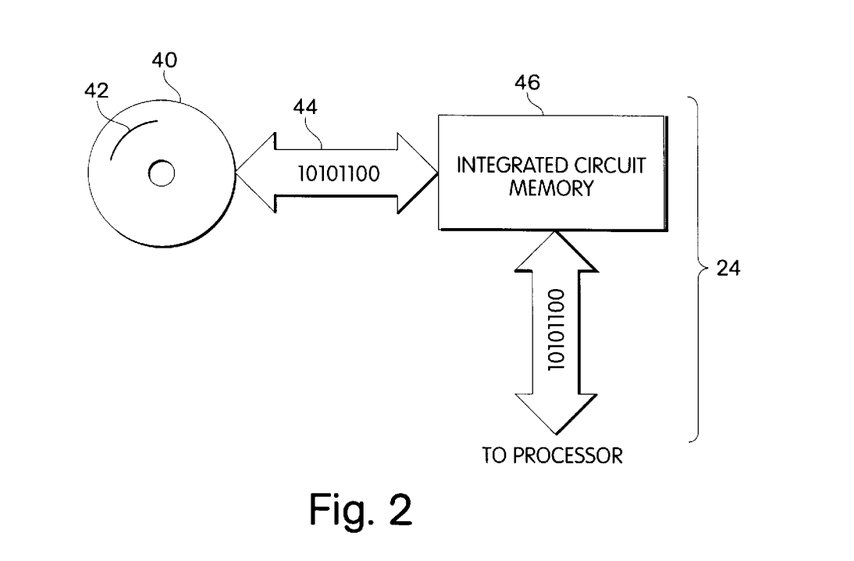
FIG. 2 is a block diagram illustrating a typical memory system for use in the computer system in FIG. 1.

An example memory system 24 will now be described in more detail in connection with FIG. 2. A memory system typically includes a computer readable and writable non-volatile recording medium 40, of which a magnetic disk, a flash memory, and tape are examples. The disk may be removable, known as a floppy disk, and/or permanent, known as a hard drive. The disk, which is shown in FIG. 2, has a number of tracks, as indicated at 42, in which signals are stored, in binary form, i.e., a form interpreted as a sequence of 1's and 0's, as shown at 44. Such signals may define an application program to be executed by the microprocessor, or information stored on the disk to be processed by the application program, such as video information stored in a data file. Typically, in operation, the processor 22 causes data to be read from the non-volatile recording medium 40 into an integrated circuit memory element 46, which is typically a volatile random access memory, such as a dynamic random access memory (DRAM) or static memory (SRAM). The integrated circuit memory element 46 allows for faster access to the information by the processor and disk 40, and is typically called the system memory. The processor generally causes the data to be manipulated within the integrated circuit memory 46 and copies the data to the disk 40 if modified, when processing is completed. A variety of mechanisms are known for managing data movement between the disk 40 and the integrated circuit memory 46, and the invention is not limited thereto. It should also be understood that the invention is not limited to a particular memory system.

Figure 3:
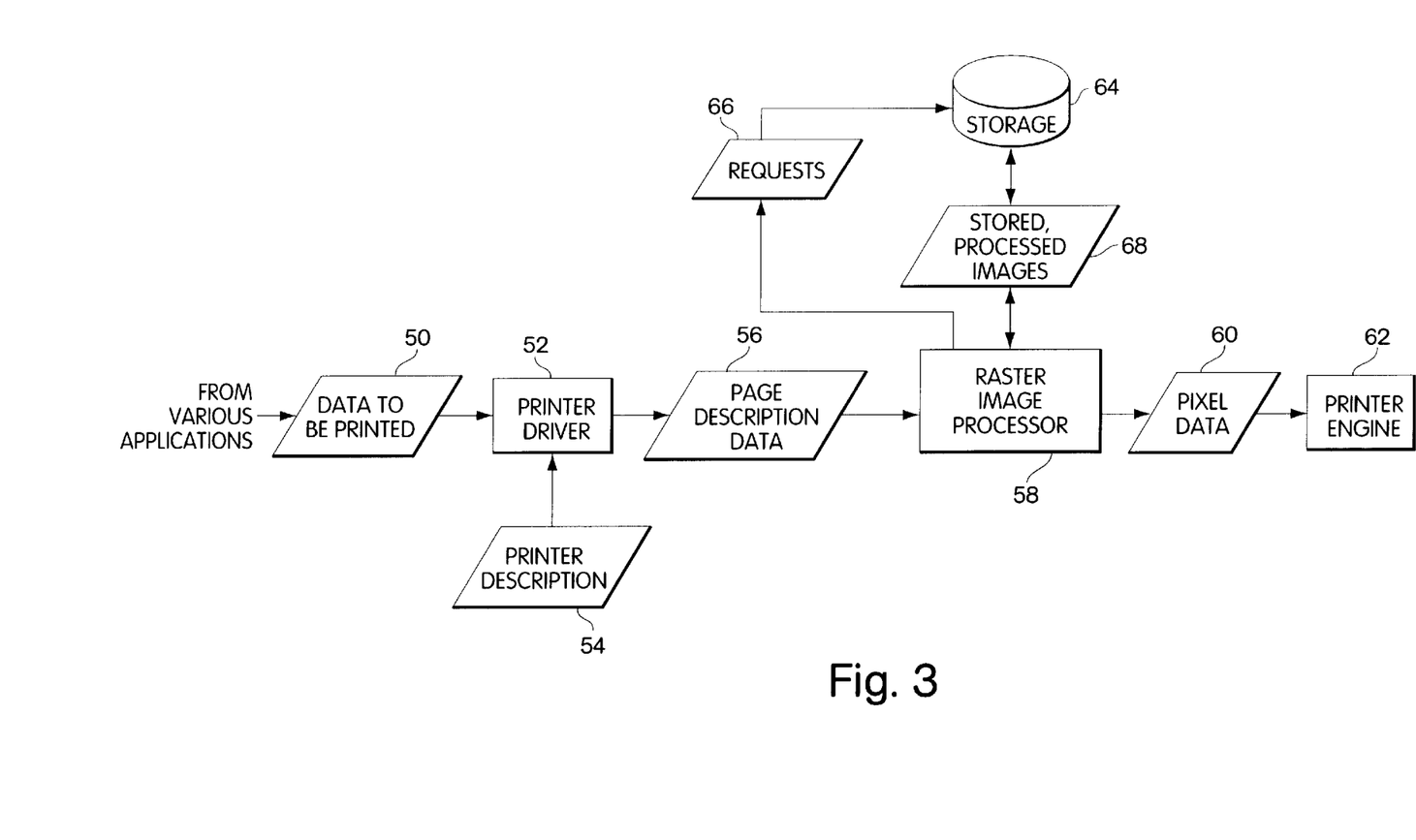
FIG. 3 is a data flow diagram of one embodiment of the present invention.

A block diagram describing one embodiment of the invention will now be described in connection with FIG. 3. Various applications (not shown) are executed by the computer system 20 and provide a data 50 to be printed. This data is received by a printer driver 52 which is another application executed on computer system 20. For example, the printer driver 52 may be an Adobe PostScript printer driver. Such a printer driver, in this embodiment, receives a printer description 54. The printer description defines several user programmable options for the printer driver 52. For an Adobe PostScript printer driver, the printer description is often called a "PostScript printer description" or "PPD". The printer description 54 is interpreted by the printer driver 52 and is used to provide an interface, such as a graphical user interface (not shown), which enables a user to input values associated with the user programmable options of the printer driver 52.

In response to data from the various applications and the values input by the user for the user programmable options, the printer driver 52 generates page description data 56, for example, in a page description language such as PostScript or Printer Control Language (PCL). The values associated with the user-programmable options typically appear at the beginning of the output of the page description data. Page description languages are a form of high level computer language. Commands in a page description language indicate a location on a page and data to be printed at the location. These commands are interpreted or compiled much like other high level computer languages such as BASIC. The page description data 56 is interpreted by a raster image processor 58 to generate pixel data 60 for a printer engine 62. The printer engine 62 uses the pixel data 60 to control a printing mechanism to place ink on paper so that the data 50 ultimately is printed. The raster image processor 58 includes a frame buffer 59 which provides and stores the pixel data 60 for use by the printer engine 62. The raster image processor 58 may reside on the computer system 20, for example, like an application called Freedom of the Press, available from ColorAge, Inc. of Billerica, Massachusetts, or may reside on the printer output device itself. On the former system, the pixel data typically is communicated over a computer network from the computer to the printer engine 62. When the raster image processor image 58 resides in the printer, the page description data 56 typically is transmitted to the printer over a computer network.

For most page description languages, such as PostScript, a corresponding raster image processor begins processing each new page of a document on a blank page, i.e., its frame buffer is initialized to all white. This blank page is modified according to the received page description data. In one embodiment of the present invention, the user-programmable options of the printer driver 52 are used to modify the page description language to specify whether the frame buffer should be initialized to other pre-processed data, allowing such pre-processed data to be the fixed content of a personalized document. Other mechanisms may be used to modify the page to description language. In turn, the raster image processor 58, which interprets the documents in this modified page description language, has an associated storage 64 in which previously processed images 68 are stored. These processed images 68 may be stored on storage 64 and may be read from storage 64 into the frame buffer 59 of the raster image processor 58 in response to requests 66. These requests are determined according to the user-programmable options.

As stated above, the user programmable data in the printer description 54 is inserted at the beginning of the stream of page description data for a document by the printer driver along with other initialization information generated by the printer driver. In one embodiment of the present invention, two options are used to allow a user to identify 1) whether a form (fixed content) is to be created 2) whether a form (fixed content) is to be used and how the form should be repeated for long documents and 3) the length in pages of each document within the data being printed. These values are input by a user through an interface generated by the printer driver, which is done using known techniques. The printer driver, when preparing page description data for a document, inserts a tag or label representing variable name and its associated value and or values in the beginning of the stream of page description data. Example names or labels for these user programmable options are "Form_Create" and "Form_Use," and "Document_Length."

Form template images, to be used as fixed content, are created with the "Form_Create" command. The value associated with this command specifies a name of a form file to be created, and changes the meaning of the subsequently processed pages. When the document description indicates that a page should be printed, the frame buffer contents are written to the form file, e.g., on a disk or other storage associated with the raster image processor. If the document consists of more than one page, the frame buffer contents of all pages of the document are written to the form file.

The "Form_Use" value specifies a name of a form file stored on disk or other storage associated with the raster image processor which will be used when rendering and printing the current document. The page description language interpreter in the raster image processor initializes the frame buffer to the contents of a corresponding frame in the form file, rather than initializing the frame buffer to be blank (white) before processing each of the pages. As will be described in more detail below, if the document has more pages than the form file, either the frames in the form file are reused in sequence, or the last frame is reused, depending on a specified parameter. This parameter may be specified as another command or with the "Form_Use" command.

The "Document_Length" value is used when a document file being processed is not a single document, but is instead the concatenation of several documents, each the same number of pages long. The number of pages in each document is the "Document_Length" value and is specified by the user. For example, this value is used by the master image processor in conjunction with the Form_Use command to permit each front page of each form letter in the document file to be associated with the first frame in the form file. For example, if each front page of a form letter is to be printed on the same letterhead, the "Document_Length" command causes the template specified by "Form_Use" to be applied starting with the first page of each document processed. Thus, when a new document is to be printed, the length of that document is known and is used to calculate what page of the form template should be used.

As an example of how these values may be used, the printer driver may insert the following string:

Form_Create=background2; Form_Use=background1, no_repeat; Document_Length=1 to indicate that the document being printed will be applied to a document called "background 1," to create a document called "background2", which has a length of 1 page. Such an example, for example, might be used to personalize company letterhead, defined by document "background 1," for a particular individual, using the document to be printed. The document being printed would then be stored as "background2," and could be used as fixed content for other documents.

As another example, several form letters could be prepared using the newly created personalized letterhead, with the following command string:

Form_Create=null; Form_Use=background2, no_repeat; Document_Length=1 These commands indicate the form letters being printed are each one page long. Each new document is printed using "background2" as the fixed content.

After preparing the command string from the user programmable options, the printer driver otherwise prepares the page description data just as it would for any other document. That is, the raster image processor 58 operates just as any other raster image processor, such as a PostScript Interpreter, with an additional capability that it is responsive to the three commands inserted by the printer driver according to the printer description 54. The processing of these three variables by the raster image processor occurs at the beginning and end of processing of each page, as will now be described.

Figure 4:
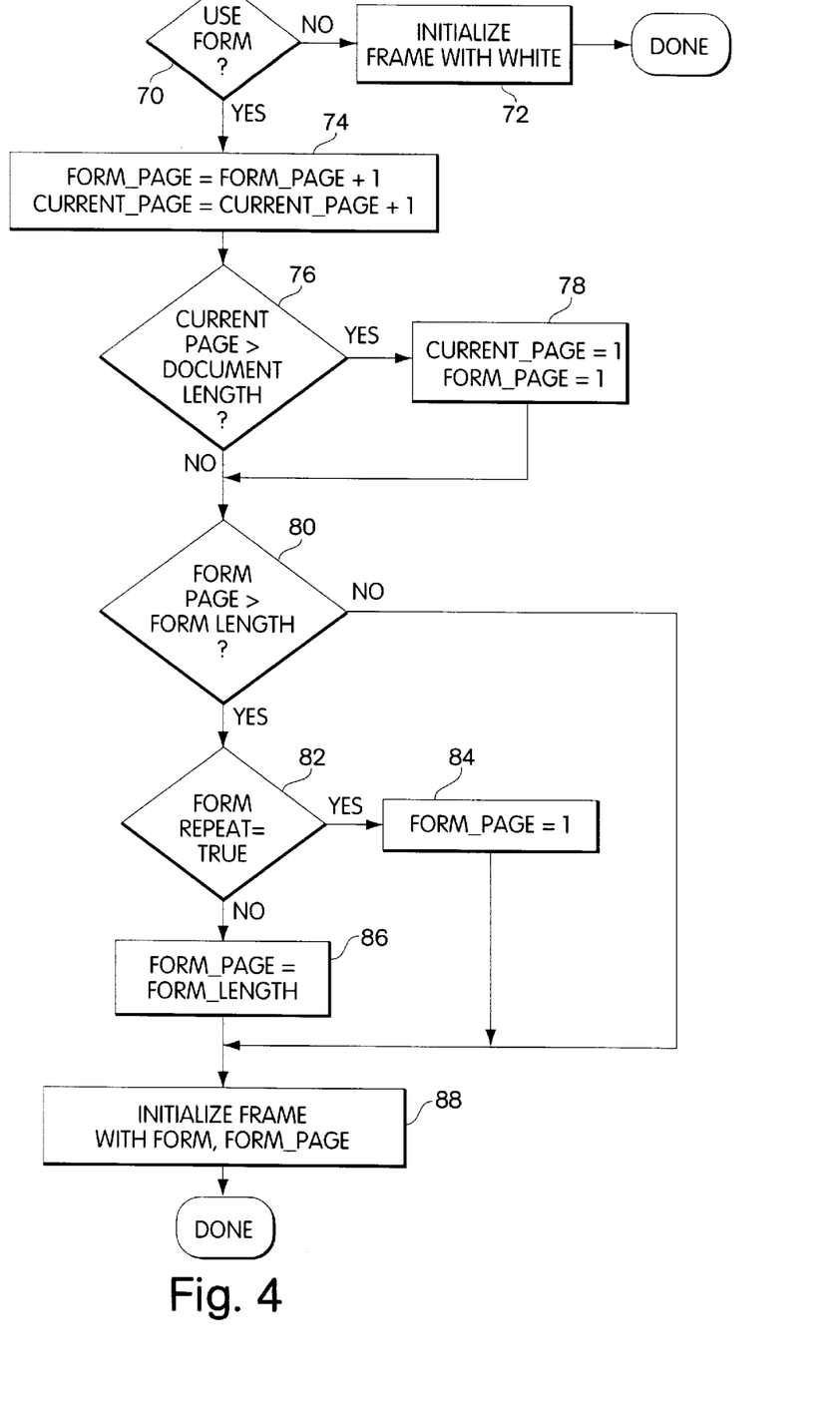
FIG. 4 is a flowchart describing processing steps taken at the beginning of a page.

Processing of a beginning of a page will now be described in connection with FIG. 4. The first step of this process is determining whether a form should be used in step 70 by evaluating the value of the "Form_Use" command. If this value does not indicate a valid stored form, the frame buffer for the page is initialized to be white in step 72. Otherwise, form page and current page counters are incremented in step 74. These values are initialized to zero at the beginning of processing the document. If the current page is greater than the Document_Length, as determined in step 76, the current page and form page are reset to page 1 in step 78. After step 78, or if the current page is less than the document length, the form page is then compared to the form length in step 80. The form length is determined from the file used to store the preprocessed image. If the form page is greater than the form length, and the form is to be repeated as determined in step 82, then the form page is set in step 84 to one. Otherwise, the form page is set to be the form length in step 86. After the correct form page is determined by step 76 through 86, the frame buffer for the page being rendered is initialized to the determined form page of the indicated form in step 88. The remainder of the document is processed in accordance with standard techniques.

Figure 5:
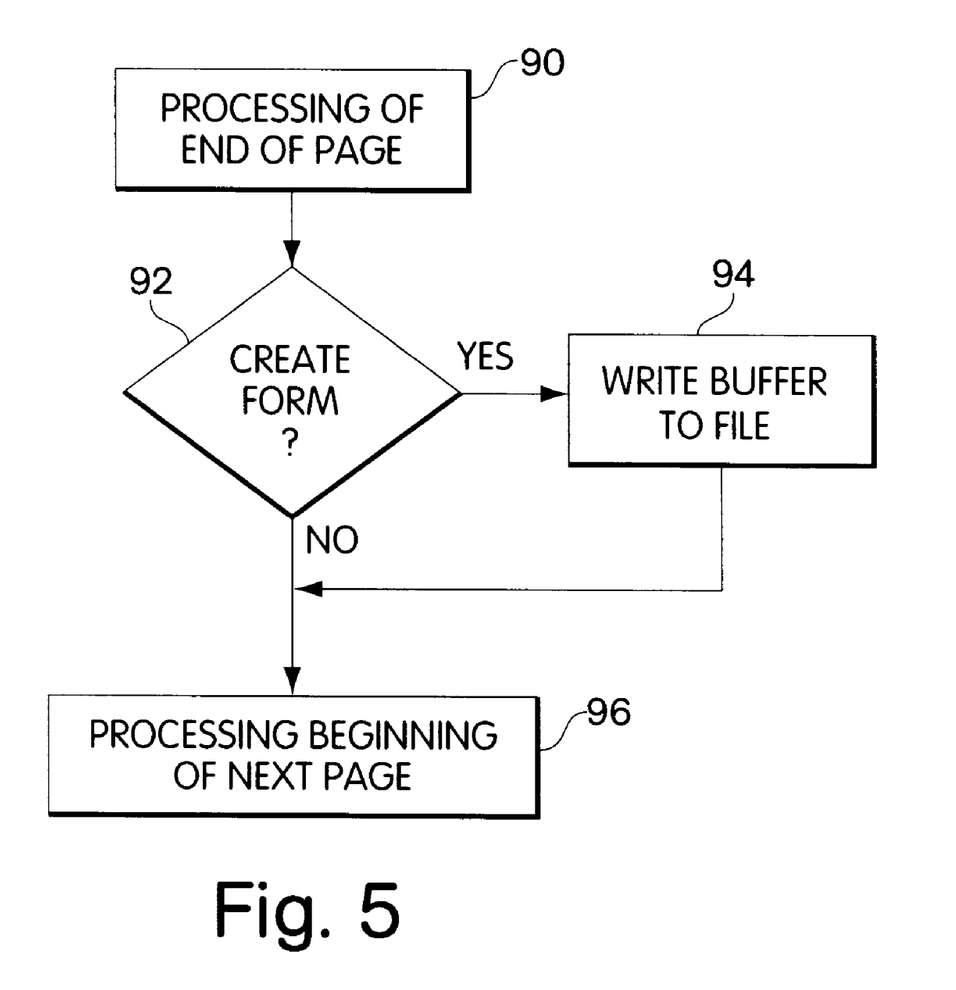
FIG. 5 is a flowchart describing processing steps taken at the end of a page.

Process at the end of the page will now be described in connection with FIG. 5. Any standard end processing is performed in step 90. If a form is to be created, as determined in step 92 by evaluating the "Form_Create" value, the contents of the frame buffer are written to a file in step 94. The file name is specified by the "Form_Create" value. For the first page rendered by the raster image processor, the file may need to be created, and file naming conflicts are handled using standard techniques. When rendering of the document is completed, the file is closed. Processing the beginning of the next page is then initiated in step 96.

Significant processing time and memory storage improvement can be gained by implementing the raster image processor using a frame buffer such as described in copending U.S. patent application Ser. No. 08/719,256, filed Sep. 24, 1996 by Carl Mikkelsen, and entitled "Computer System for Processing Images using a Virtual Frame Buffer," which is hereby incorporated by reference. In that system, a frame buffer is represented as a set of addressable regions. Each region may have its own form of compression and may be stored on disk or be resident in the frame buffer. Such a frame buffer simplifies the steps of initialization of the frame buffer and storage of the frame buffer contents, while reducing the amount of memory required to store an image.

In particular, each frame of preprocessed fixed content is stored using a representation including an indication of a plurality of regions into which the frame is divided, compressed image data for each region and an index indicating a storage location of the compressed image data for each region. The preprocessed fixed content is read into the virtual frame buffer by initializing a representation of the virtual frame buffer using the indication of the plurality of regions and the index. Variable content information is added by identifying each pixel of the frame buffer affected by the variable content information, and changing the pixel value to contain the variable information. Modifying the pixel value may require compressing, decompressing or otherwise processing the previous contents of the pixel.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, the initialization information described above, which may indicate a form template to be used or generated, may be specified using mechanisms other than a user programmable option of the printer driver. For example, a separate database accessible by the raster image processor or printer driver may match document titles or users with intended actions. Thus, a particular user may always have an associated form template. Separate applications, such as an operator console or print queue manager, may also be used to deliver instructions to the raster image processor, as an example. Yet other sources of the initialization information are possible. These and other modifications are contemplated as falling within the scope of the invention as defined by the appended claims and equivalents thereto.

What is claimed is:

1. A raster image processor for a computer system for generating personalized documents, using a frame buffer, and having a first input for receiving fixed content and a second input for receiving variable content, the raster image processor comprising:

means for accessing a source of the fixed content to retrieve the fixed content;

means for storing processed fixed content;

means for initializing the frame buffer according to processed fixed content, wherein the processed fixed content comprises fixed raster data;

means for accessing a source of the variable content to retrieve the variable content; and means for modifying the initialized frame buffer according to processed variable content, wherein the processed variable content comprises variable raster data.

2. The raster image processor of claim 1, further comprising means for recalling stored processed fixed content.

3. The raster image processor of claim 1, wherein the source of the fixed content comprises an indication of processed fixed content.

4. The raster image processor of claim 1, further comprising means for processing fixed content to generate processed fixed content.

5. The raster image processor of claim 1, wherein the source of the variable content comprises an indication of processed variable content.

6. The raster image processor of claim 1, further comprising means for processing variable content to generate processed variable content.

7. The raster image processor of claim 3, wherein the variable content comprises initialization information at the beginning of the variable content and includes an indication of the source of the fixed content.

8. The raster image processor of claim 4, wherein the variable content comprises initialization information at the beginning of the variable content and includes an indication of the source of the fixed content.

9. The raster image processor of claim 4, further comprising means for processing variable content to generate processed variable content.

10. The raster image processor of claim 9, wherein each frame of the processed fixed content is stored using a representation including an indication of a plurality of regions into which a frame is divided, compressed image data for each region and an index indicating a storage location of the compressed image data for each region.

11. The raster image processor of claim 10, wherein the means for recalling stored processed fixed content includes means for initializing a representation of the frame buffer using the indication of the plurality of regions and the index.

12. The raster image processor of claim 11, further comprising means for processing variable content, further comprising:

means for identifying each pixel of the frame buffer affected by the variable content;

means for decompressing the image data of each identified region; and means for modifying the decompressed image data according to the variable content.

13. The raster image processor of claim 3, further comprising a third input for receiving initialization information including an indication of the source of the fixed content.

14. The raster image processor of claim 4, further comprising a third input for receiving initialization information including an indication of the source of the fixed content.

15. A method for generating personalized documents, comprising steps of:

storing image data in a frame buffer; and processing image data by accessing a source of fixed content to retrieve the fixed content; storing processed fixed content;
initializing the frame buffer according to processed fixed content, wherein the processed fixed content comprises fixed raster data;
accessing a source of the variable content to retrieve the variable content; and
modifying the initialized frame buffer according to processed variable content, wherein the processed variable content comprises variable raster data.

16. The method of claim 15, further comprising a step of recalling stored processed fixed content.

17. The method of claim 15, wherein the source of the fixed content comprises an indication of processed fixed content.

18. The method of claim 15, further comprising a step of processing fixed content to generate processed fixed content.

19. The method of claim 15, wherein the source of the variable content comprises an indication of processed variable content.

20. The method of claim 15, further comprising a step of processing variable content to generate processed variable content.

21. The method of claim 17, wherein the variable content comprises initialization information at the beginning of the variable content and includes an indication of the source of the fixed content.

22. The method of claim 18, wherein the variable content comprises initialization information at the beginning of the variable content and includes an indication of the source of the fixed content.

23. The method of claim 18, further comprising a step of processing variable content to generate processed variable content.

24. The method of claim 23, wherein each frame of the processed fixed content is stored using a representation including an indication of a plurality of regions into which a frame is divided, compressed image data for each region and an index indicating a storage location of the compressed image data for each region.

25. The method of claim 24, wherein the step of recalling stored processed fixed content includes a step of initializing a representation of the frame buffer using the indication of the plurality of regions and the index.

26. The method of claim 25, further comprising a step of processing variable content, further comprising steps of:

identifying each pixel of the frame buffer affected by the variable content;

decompressing the image data of each identified region; and modifying the decompressed image data according to the variable content.

27. The method of claim 17, further comprising a step of receiving initialization information including an indication of the source of the fixed content.

28. The method of claim 18, further comprising a step of receiving initialization information including an indication of the source of the fixed content.

* * * * *